May 29, 1928.
J. V. GIESLER
1,671,525
AUTOMATIC TEMPERATURE REGULATOR
Filed May 16, 1923　　2 Sheets-Sheet 2
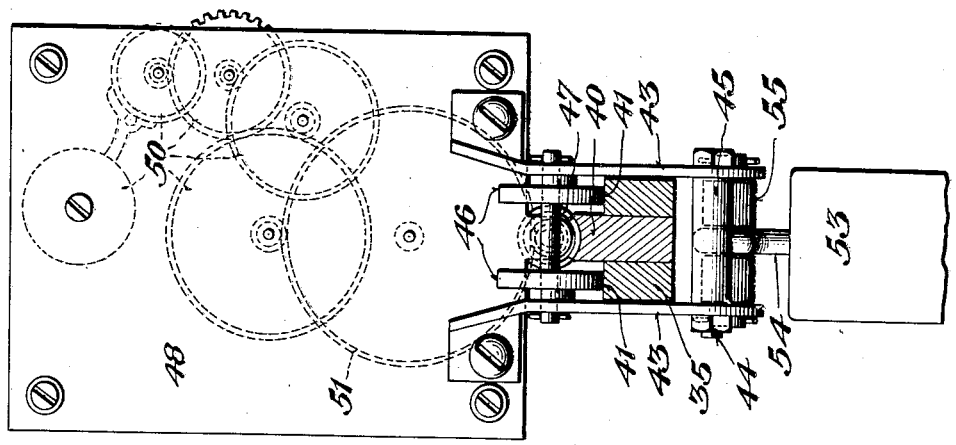
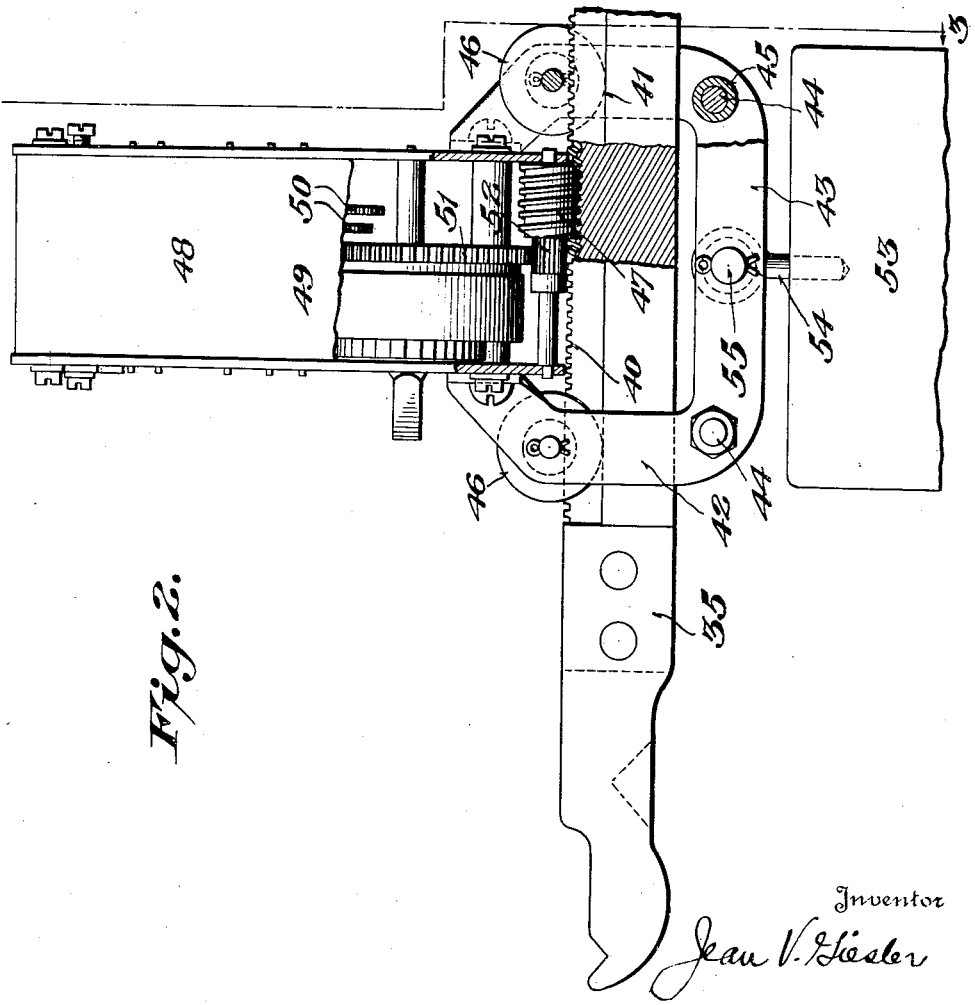

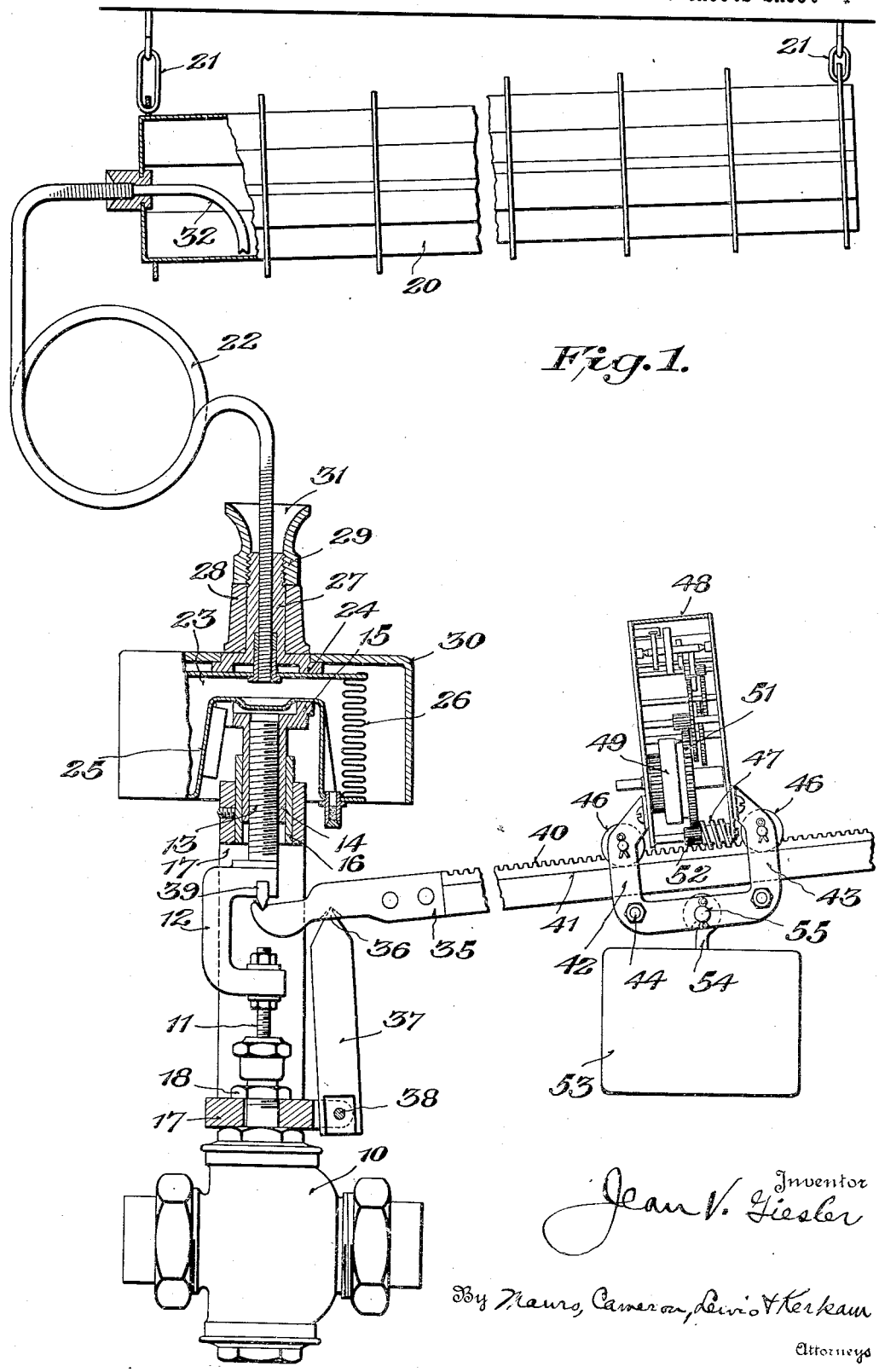

Patented May 29, 1928.

1,671,525

UNITED STATES PATENT OFFICE.

JEAN V. GIESLER, OF KNOXVILLE, TENNESSEE, ASSIGNOR, BY MESNE ASSIGNMENTS, TO THE FULTON SYLPHON COMPANY, OF KNOXVILLE, TENNESSEE, A CORPORATION OF DELAWARE.

AUTOMATIC TEMPERATURE REGULATOR.

Application filed May 16, 1923. Serial No. 639,428.

This invention relates to temperature regulating apparatus and, more particularly, to means whereby the temperature may be automatically varied in a predetermined manner.

It is sometimes desirable, as in drying lumber for example, to automatically change the temperature which is being maintained by a thermostatic device, so that during or after predetermined intervals of time there shall be effected a predetermined increase or decrease in the temperature. Various devices for automatically varying the temperature maintained by a thermostat have heretofore been suggested, such for example as to move an electric contact automatically with respect to a body of mercury the expansion and contraction of which closes and opens an electric circuit for determining the regulation of temperature; or to provide a conduit conveying a heated medium with a valve the valve member and the valve seat of which are relatively movable, one by a thermostat and the other by a time controlling apparatus; or to vary the extent of lost motion in a thermostat by a time controlling apparatus; etc. But all devices of this character of which I am aware are relatively complicated and expensive to manufacture, are relatively easy to get out of order whereby they require close attention and considerable expense in their upkeep, and some necessitate the use of a special type or construction of thermostat. It has also been proposed to provide temperature regulating apparatus with a weight moved by the alarm train of a clock at a predetermined instant of time so as to effect a sudden actuation of the temperature regulating apparatus, to open a damper for example, but devices of this character are incapable of progressively or successively varying the adjustment of a temperature regulating apparatus in a predetermined manner in order to effect automatically a gradually or intermittently varied temperature.

It is an object of this invention to provide a temperature regulating apparatus with means for automatically varying the temperature maintained by a thermostat which is simple in construction, inexpensive to manufacture, rugged in construction so that it does not get out of order easily, and which, with a minimum of attention and expense, will closely and accurately adjust the temperature to be maintained in a predetermined manner.

Other objects of this invention are to provide a device of the type characterized which may employ a standard type of thermostats, and thereby eliminate the necessity for the use of a specially constructed thermostat where automatic variation of the temperature is desired; and to provide a device for automatically varying the temperature maintained by a thermostat which may be readily applied to existing thermostats and which may be supplied as a substitute or interchangeable adjusting device for the thermostats of standard temperature regulators.

The invention is capable of receiving a variety of mechanical expressions one of which is shown on the accompanying drawings, but it is to be expressly understood that the drawings are for the purpose of illustration only and are not to be construed as a definition of the limits of the invention, reference being had to the appended claims for that purpose.

Referring in detail to said drawings, wherein the same reference characters are employed to designate corresponding parts in the several figures:—

Fig. 1 is an elevation, partly in section, of a temperature regulator embodying the present invention;

Fig. 2 is an enlarged elevation, partly in section, of the automatic means for predetermining the temperature; and Fig. 3 is an elevation, partly in section, on the line 3—3 of Fig. 2.

In the form shown, the temperature regulating apparatus comprises any suitable means for regulating the supply of heat, as a valve 10 for controlling the flow of a heated medium, such as steam, or a heating medium, such as oil or gas, although it is to be expressly understood that a valve has been selected merely as typical of any suitable temperature regulating means, as the same could take a variety of other forms, as the switch of an electric circuit for example. The spindle 11 of the valve 10 is suitably connected to a block 12, shown as of generally U-shaped formation for a purpose to be explained, and extending from said block 12 is a threaded stem 13 which has adjustably threaded thereon a sleeve 14 provided with a plate 15. The valve spindle with its attached parts is guided in and restricted to a rectilinear movement by the cooperation of said sleeve 14 with a guide sleeve 16 suitably retained in the frame 17, which frame may be mounted on the bonnet of the valve 10 and retained in position by one or more nuts 18.

The temperature regulating apparatus also includes a thermostat of any suitable construction, such for example as disclosed and claimed in my prior application Serial No. 478,352, filed June 17, 1921, entitled Temperature responsive devices. In the form shown, said thermostat includes a vaporizing chamber or bulb 20, which may be suitably suspended from the wall of a room or other enclosure as illustrated at 21, and which communicates through a flexible tube 22 of any suitable construction with an expansible and collapsible vessel 23 of any suitable construction. In the device illustrated, said vessel 23 includes a stationary end wall 24 and a movable end wall 25 connected by a deeply corrugated expansible and collapsible tubular wall 26, of any suitable material but preferably of resilient metal such as brass, which is suitably attached to the end walls 24 and 25 as by brazing. The end wall 25 may be of generally cup-shaped formation as shown so as to reduce the volume of the expansible and collapsible vessel 23. Said vessel 23 is mounted in position in any suitable way with its end wall 24 held fixedly in position and its movable end wall 25 in engagement with the plate 15 connected to the valve spindle, said end wall 25 preferably only contacting plate 15, although it may be suitably connected thereto if desired. In the form shown, the end wall 24 is provided with a nipple 27, suitably attached thereto as by brazing, which projects through the sleeve-like extremity 28 of the frame 17, and said nipple and end wall 24 are clamped fixedly in position by a sutiable nut 29 threaded onto the projecting end of said nipple. Said nipple or end wall 24 may also if desired support a housing member 30 to protect the vessel 23 from injury. The flexible tube 22 projects through the nipple 27 and is suitably attached to the end wall 24 and, to prevent said tube from being bent sharply adjacent the vessel and its support, the nut 29 is preferably provided with a flared extension 31 as illustrated. The opposite end of the tube 22 projects through and is suitably attached to the end wall of the bulb or chamber 20 and, as illustrated, the inwardly projecting end 32 of said tube is preferably bent into proximity to the side wall of said bulb or chamber so as to constitute a trap to prevent the passage of vapor from said bulb or chamber to the vessel 23. The vessel 23 and the tube 22 are filled with any suitable volatile liquid and the bulb or chamber 20 also contains a small quantity of said liquid, said quantity being sufficient however to always maintain the end 32 of the tube 22 immersed therein. The remainder of the space in the bulb or chamber 20 is filled with the vapor of said liquid, and as the tension of said vapor varies in response to changes of temperature, the pressure of said vapor on the liquid in said bulb or chamber is transmitted through the column of liquid in the tube 22 to the liquid in the vessel 23 so that the movable end wall 25 of said vessel moves in response to the variations of the vapor tension to control the position of the valve 10. While one form of thermostat has thus been described in detail, it is to be expressly understood that the invention is not restricted thereto, as any other suitable form of thermostat may be used, such for example as the type employing an expansible and collapsible vessel without a bulb communicating therewith.

Thermostats of the character so far described are generally provided with a spring or a weighted lever or other suitable mechanism for adjusting the thermostat, so as to predetermine the temperatures at which the vapor tension within the thermostat will effect the movement of the member 25. In the form shown, means are provided for opposing the movement of said member 25 in one direction and said means are so constructed as to automatically vary said opposition so as to predeterminately vary the temperature maintained by the temperature regulating device. While any suitable means as an adjustable spring may be employed to oppose the expansion of the expansible and collapsible vessel 23, the construction illustrated includes a weighted lever, and means are provided for automatically adjusting the position of said weight on said lever. To this end, a lever 35 is fulcrumed on a knife edge 36 provided on the extremity of an arm 37, which is pivoted at 38 on the frame member 17. The short arm of said lever engages a knife edge 39 suitably mounted in the block 12, said block being given the U-shaped formation heretofore described to receive said short arm of said lever. The long arm of said lever 35 carries a weight which is adjustable longitudinally of the same, and any suitable means may be provided for automatically adjusting said weight. In the form shown, the long arm of the lever is provided intermediate its width with a longitudinally extending rack 40, the upper surface of the lever on either side of said rack being formed as a track 41. Mounted on said lever is a carriage 42 of any suitable construction, shown as formed by a pair of gentrally rectangular frames 43, one on either side of the lever, suitably held in spaced relation by bolts 44 extending through said frames and through spacing sleeve 45 interposed between the same. The upper portion of the carriage is provided adjacent either end thereof with a pair of roller 46 designed to travel on the tracks 41 heretofore described. Mounted on the carriage 42 is a motor for driving a worm or other suitable gear 47 in mesh with the rack 40. While any suitable motor may be employed for this purpose, such as a constant speed electric motor, I prefer to employ time controlling mechanism and, to this end, the carriage 42 is shown as carrying a clock 48 of any suitable construction. The main spring of the clock is diagrammatically indicated at 49, and the usual gears for driving the hands and leading to the escapement mechanism are shown diagrammatically at 50. The spring-driven pinion 51 meshes with a pinion 52 on the spindle of the worm 47. Thereby, as the clock mechanism is operated by the main spring, the worm 47 is rotated to gradually or progressively feed the carriage 42 along the lever 35 due to the coaction of said worm with the rack 40 and the weight of the parts is taken off the worm and rack by the rollers 46 on the tracks 41. While the clock in some instances may be sufficient to constitute the adjustable weight, a weight 53 is preferably mounted on the carriage 42 in any suitable manner, the same being shown as suspended from the carriage by an eye-bolt 54 mounted on a dowel pin 55 in the carriage.

In operation, the mechanism of the clock 48 rotates the worm 47 and gives a successive or progressive movement of the carriage 42 with its attached weight 53 along the lever 35 to vary the moment of said weight with respect to the fulcrum 36. Thereby the upward pressure of the inner arm of the lever 35 on the block 12 and stem 13, which is transmitted to the movable end wall 25 of the vessel 23 by the plate 15, is automatically adjusted with the lapse of time, whereby the vapor tension in the bulb or chamber 20 that is necessary to expand the vessel and operate the valve is automatically varied. For any given position of the motor-operated weight on the lever 35, the thermostat tends to maintain a predetermined temperature in the room or other enclosure in which the device is installed, because, if the temperature falls, the vapor tension in the chamber 20 is decreased, whereby the pressure of the end wall 25 of the vessel 23 is also decreased, and the weighted lever collapses the vessel and raises the valve spindle to open the valve, and if the temperature rises the vapor tension in the chamber 20 is increased, the vessel 23 is expanded due to the increased pressure and the end wall 25 is moved against the opposition of the weighted lever to close the valve. But, owing to the successive or progressive variation in the position of the weight on the lever, the temperature which will be maintained by the operation of the device will be varied in a predetermined manner depending upon the rate and manner in which the weight is automatically moved along the lever. It is apparent that, by removing the carriage 42 from the lever 35 and reversing its position on said lever, the direction of movement of the weight can be reversed so that the temperature may be either continuously increased or decreased during a predetermined interval of time, and the range of temperatures maintained can be varied by varying the position of the weight at the beginning and end of its movement. While the weight may be moved continuously during a predetermined time interval, it is apparent that by the use of suitable means, such as mutilated gears in the driving train of the worm, the feed of the weight may be predeterminately intermittent.

It will therefore be perceived that a device has been provided for automatically varying the temperature to be maintained by a thermostatic temperature regulator which is simple and compact in structure, inexpensive to manufacture and maintain, not likely to get out of order, and capable of use by unskilled labor. Moreover, no special form of thermostat is required as the construction illustrated may be applied to standard types of thermostat, and additionally, as the lever with its automatically operated weight may be easily inserted in and removed from the thermostatic regulator, it may be readily applied to existing thermostats or may be supplied as an interchangeable device for the lever and manually adjustable weight which is frequently provided on thermostats of this character.

While the regulating means has been shown as a valve for regulating the supply of heat, it is to be expressly understood that the invention is not limited thereto. Moreover, the term "regulating means" is to be construed as generic to means for regulating the wet bulb temperature as well as the dry bulb temperature, and also to other means regulated in conformity with variations of temperature. Also, while the embodiment of the present invention illustrated on the drawings has been described with considerable particularity, it is to be expressly understood that the invention is not restricted thereto, as the same is capable of receiving a variety of mechanical expressions some of which will now readily suggest themselves to those skilled in the art, while changes may be made in the details of construction, arrangement and proportion of the parts, certain features used without other features, and means may be provided for automatically starting, stopping or reversing the movement of the weight in a predetermined manner, without departing from the spirit of this invention. Reference is therefore to be had to the claims hereto appended for the definition of the limits of said invention.

What is claimed is:—

1. In a temperature regulating apparatus, in combination with means for regulating the supply of heat, a thermostat for operating said means over a wide range of temperatures, a lever provided with an adjustable weight for predetermining the temperatures at which said thermostat may operate said means, and motive means for moving said weight along said lever to progressively vary the temperature at which said thermostat may operate said means.

2. In a temperature regulating apparatus, in combination with means for regulating the supply of heat, a thermostat for operating said means over a wide range of temperatures, a lever provided with an adjustable weight for predetermining the temperatures at which said thermostat may operate said means, and time-controlled means for gradually moving said weight on said lever.

3. In a temperature regulating apparatus, in combination with means for regulating the supply of heat, a thermostat for operating said means over a wide range of temperatures, a lever provided with an adjustable weight for predetermining the temperatures at which said thermostat may operate said means, and a motor mounted on said weight for gradually adjusting said weight on said lever.

4. In a temperature regulating apparatus, in combination with means for regulating the supply of heat, a thermostat for operating said means over a wide range of temperatures, a lever provided with an adjustable weight for predetermining the temperatures at which said thermostat may operate said means, and time-controlled means mounted on said weight for progressing the same along said lever.

5. In a temperature regulating apparatus, in combination with means for regulating the supply of heat, a thermostat for operating said means over a wide range of temperatures, a lever provided with an adjustable weight for predetermining the temperatures at which said thermostat may operate said means, and automatically-operating means for moving said weight on said lever in a predetermined manner to successively adjust the temperature at which said thermostat may operate said first-named means.

6. In a temperature regulating apparatus, in combination with means for regulating the supply of heat, a thermostat for operating said means over a wide range of temperatures, a lever provided with an adjustable weight for predetermining the temperatures at which said thermostat may operate said means, and a clock for predeterminately varying the position of said weight on said lever to adjust the temperature at which said thermostat may operate said first-named means after predetermined time intervals.

7. In a temperature regulating apparatus, in combination with means for regulating the supply of heat, a thermostat for operating said means over a wide range of temperatures, a lever provided with an adjustable weight for predetermining the temperatures at which said thermostat may operate said means, and means on said weight for predeterminately adjusting its position with respect to said lever with the lapse of time.

8. In combination with regulating means, a thermostat for operating said regulating means and including a member movable in response to variations of pressure, means for opposing the movement of said member in one direction, and a motor operating independently of said regulating means for adjusting said last-named means to successively vary its opposition to the movement of said member.

9. In combination with regulating means, a termostat for operating said regulating means and including a member movable in response to variations of pressure, means for opposing the movement of said member in one direction, and time-controlled means for adjusting the opposition of said last-named means with the lapse of time.

10. In combination with regulating means, a thermostat for operating said regulating means and including a member movable in response to variations of pressure, means for opposing the movement of said member in one direction, and a clock for predeterminately changing the opposition of said last-named means after predetermined time intervals.

11. In combination with regulating means, a thermostat for operating said regulating means and including a member movable in response to variations of pressure, means for opposing the movement of said member in one direction, and automatic means for progressively adjusting the opposition of said last-named means at progressive time intervals.

12. In combination with regulating means, a thermostat for operating said regulating means and including a member movable in response to variations of vapor tension, means for opposing the movement of said member in one direction, and means for continuously varying the opposition of said last-named means during a predetermined time interval.

13. In combination with regulating means, a thermostat for operating said means and including an expansible and collapsible vessel having a movable end wall operatively connected to said regulating means, means for opposing expansion of said vessel, and automatic means movable with said last-named means for automatically varying the amount of its opposition.

14. In combination with regulating means, a thermostat for operating said means and including an expansible and collapsible vessel having a movable end wall operatively connected to said regulating means, means for opposing expansion of said vessel, and time-controlled mechanism for varying the amount of opposition of said last-named means with the lapse of time.

15. In combination with regulating means, a thermostat for operating said means and including an expansible and collapsible vessel having a movable end wall operatively connected to said regulating means, means for opposing expansion of said vessel, and a motor for predeterminately varying the opposition of said last-named means at predetermined intervals of time.

16. In combination with regulating means and a thermostat for operating said regulating means, a readily insertable and removable weighted lever for adjusting said thermostat carrying motive means for adjusting the weight on said lever.

17. In combination with regulating means and a thermostat for operating said regulating means, a readily insertable and removable weighted lever for adjusting said thermostat, said weight carrying time-controlled means for adjusting said weight on said lever.

18. A weighted lever for automatically adjusting a thermostat, said weighted lever being readily insertable and removable from the thermostat and carrying motive means for predeterminately varying the position of said weight on said lever.

19. A weighted lever for automatically adjusting a thermostat, said weighted lever being readily insertable and removable from the thermostat and provided with time-controlled mechanism for progressively adjusting said weight on said lever.

20. A weighted lever for automatically adjusting a thermostat, said weighted lever being readily insertable and removable from the thermostat and provided with a motor on said weight for successively moving the same on said lever.

In testimony whereof I have signed this specification.

JEAN V. GIESLER.